United States Patent

Kath et al.

[11] Patent Number: 5,099,698
[45] Date of Patent: Mar. 31, 1992

[54] ELECTRONIC READOUT FOR A ROTAMETER FLOW GAUGE

[75] Inventors: Gary S. Kath, Scotch Plains; Gregory W. King, Carteret, both of N.J.

[73] Assignee: Merck & Co., Rahway, N.J.

[21] Appl. No.: 337,977

[22] Filed: Apr. 14, 1989

[51] Int. Cl.⁵ .............................................. G01F 1/22
[52] U.S. Cl. .................................................. 73/861.56
[58] Field of Search .................. 73/861.56, 293, 313, 73/314; 356/375

[56] References Cited

U.S. PATENT DOCUMENTS

| | | |
|---|---|---|
| 3,251,227 | 5/1963 | Ichihara et al. |
| 3,404,568 | 10/1968 | Humbler et al. ............. 73/861.56 |
| 3,876,311 | 4/1975 | Sasayama ..................... 356/375 |
| 3,898,445 | 8/1975 | MacLeod et al. ............. 356/375 |
| 3,956,933 | 5/1976 | Metzger . |
| 4,200,806 | 4/1980 | Walker et al. ................ 73/861.56 |
| 4,223,557 | 9/1980 | Brinkman . |
| 4,241,739 | 12/1980 | Elson . |
| 4,245,997 | 1/1981 | Wiesner . |
| 4,302,980 | 12/1981 | Braatz . |
| 4,316,103 | 2/1982 | Nathanson . |
| 4,461,576 | 7/1984 | King ............................ 356/375 |
| 4,471,378 | 9/1984 | Ng . |
| 4,550,417 | 10/1985 | Nunogaki et al. . |
| 4,559,834 | 12/1985 | Phillips et al. . |
| 4,575,769 | 3/1986 | Arnoldi . |
| 4,630,485 | 12/1986 | Wastl, Sr. . |
| 4,819,051 | 4/1989 | Jacobson . |

FOREIGN PATENT DOCUMENTS

| | | | |
|---|---|---|---|
| 0014902 | 2/1981 | Japan | ............ 356/375 |
| 0053703 | 3/1983 | Japan . | |

Primary Examiner—Herbert Goldstein
Attorney, Agent, or Firm—Lowe, Price, LeBlanc & Becker

[57] ABSTRACT

An electronic readout for a rotameter flow gauge which includes means for optically scanning a rotameter flow gauge and determining the position of a float within the rotameter.

15 Claims, 2 Drawing Sheets

ELECTRONIC READOUT FOR A ROTAMETER FLOW GAUGE

TECHNICAL FIELD

The present invention relates generally to the field of gas or liquid flow measurement devices and more particularly relates to an electronic readout device for use in conjunction with a rotameter flow gauge.

BACKGROUND ART

Flow meters are widely used in industry and research to indicate and/or control flow rates of gases or flow rates of liquids to improve processing and increase the operation efficiency of the equipment involved. This type of instrument is basically a vertical-internally tapered, so-called "float" or meter tube mounted with the large end at the top of the instrument and a ball-like float or rotor with an outer diameter slightly less than the minimum diameter of the tube, being placed inside the float tube. The clearance space between the float and the float tube internal surfacing forms an annular passage or orifice, and as the float tube is defined by a tapering bore that diverges upwardly, the area of this orifice is larger when the float is near the top of the float tube than when the float is near the bottom of the float tube. By connecting the float tube into a fluid flow line so that fluid flow direction is from the bottom to the top of the float tube, the float will move upwardly and be supported at a point where the orifice is just large enough to pass the fluid flowing through the system. By making the float tube transparent so that the position of the float can be seen and by providing a scale along side the float tube, the flow position may be "read" in terms of numbers on the scale which are provided in accordance with standard practices in this field.

The rotameter has become one of the most popular flow meters in the chemical process industries. In the usual type of rotameter a weighted plummet or float contained in an upright tapered tube is raised to a position of equilibrium between the downward force of the flow and the upward force of the fluid flowing past the float through the annular orifice surrounding the float. The term "rotameter" was derived from the fact the plummets originally had slots to impart a rotational force thereto for the purpose of centering and stabilizing the float. The present trend, however, is toward non-rotating floats.

To provide for more versatility in the application, interchangeable precision-bore glass tubes and metal metering tubes are available. Rotameters have proved satisfactory for both gases and liquids at high and low pressures. A single instrument can readily cover a tenfold range of flow, and by providing "floats" of different densities, a two-hundred fold range is practicable.

Aside from rotameters which require visual observation of the height of the float inside the tube, there exists electronic flow meter devices commercially available that operate on different principles such as rotating vanes, pressure drops, ultrasonic measurements, etc. Such commercially available electronic flow meter devices disadvantageously require that the liquid or gas flow to be measured contacts metal parts of the flow meter devices. Besides the problems associated with invasively contacting the fluid flow to be measured, known electronic flow meters generally are unable to operate in the presence of large magnetic fields such as NMR fields generally used in connection with medical environments including working hearts and other circulatory systems.

While automatic monitoring and control is desirable in flow metering, conventional rotameters used today generally require visual observation and manual recording.

U.S. Pat. No. 4,630,485 to Wastl, Sr. discloses a gas or low volume liquid flow meter permitting non-invasive electrical monitoring of the flow of a fluid at relatively low pressures and flow rates. The flow meter of this patent includes a housing provided with a generally cylindrical shaped chamber and a spherically shaped float indicator which is movable vertically within the chamber. A position detector means is also provided, non-invasively mounted to the flow meter, for detecting the vertical position of the indicator and providing an electrical output signal which is responsive thereto. The position detector includes a light source and a light sensitive element which is a photopotentiometer having a light sensitive surface. The resistance across the light sensitive surface of the photopotentiometer increases as the shadow cast by the float indicator moves upwardly.

U.S. Pat. No. 4,241,739 to Elson discloses a volume calculator for a spirometer which includes a vertically extending chamber and a movable indicator located with the chamber. The chamber is arranged between an energy source and an energy detector which communicate with one another by means of an energy beam, the chamber being transparent to the particular type of energy transmitted by the energy source. When the indicator rises to a height in the chamber adjacent the energy source, the energy beam is interrupted and the electronic circuitry is activated to measure the time that the energy beam is interrupted and calculates the total volume of inspired air.

The present invention provides for a means to accurately monitor fluid flow utilizing a standard rotameter. More particularly, the present invention provides a means for monitoring the position of the float in a rotameter in a manner that optically scans the rotameter for the float position.

DISCLOSURE OF THE INVENTION

It is accordingly one object of the present invention to provide means for accurately monitoring the flow of fluid which does not involve invasively contacting the flowing fluid with metal parts.

A further object of the present invention is to provide a means and method whereby very low fluid flow rates may be accurately measured and monitored.

A further object of the present invention is to provide an apparatus for monitoring fluid flow rates which is unaffected by a large magnetic field such as NMR.

A still further object of the present invention is to provide an electronic output means that may be utilized in conjunction with a rotameter for measuring and monitoring fluid flow which may be directly connected to a digital meter or a computer for automatic data collection and/or response.

According to this invention, there is provided an electronic readout for a rotameter flow gauge which includes means for optically scanning a rotameter flow gauge and determining the position of a flow within the rotameter.

The present invention also provides for a fluid flow measuring system that includes a rotameter having a float therein and means for repeatedly optically scanning the rotameter for determining the position of the float.

Also provided by the present invention is a method for measuring fluid flow which involves optically scanning the rotameter and determining the position of a float within the rotameter.

These and other objects and features of the present invention will be apparent from the following detailed description taken with reference to the accompanying drawing.

The present invention will be described with reference to the annexed drawings which are given by way of non-limiting examples only in which:

BEST MODE FOR CARRYING OUT THE INVENTION

Figure 1:
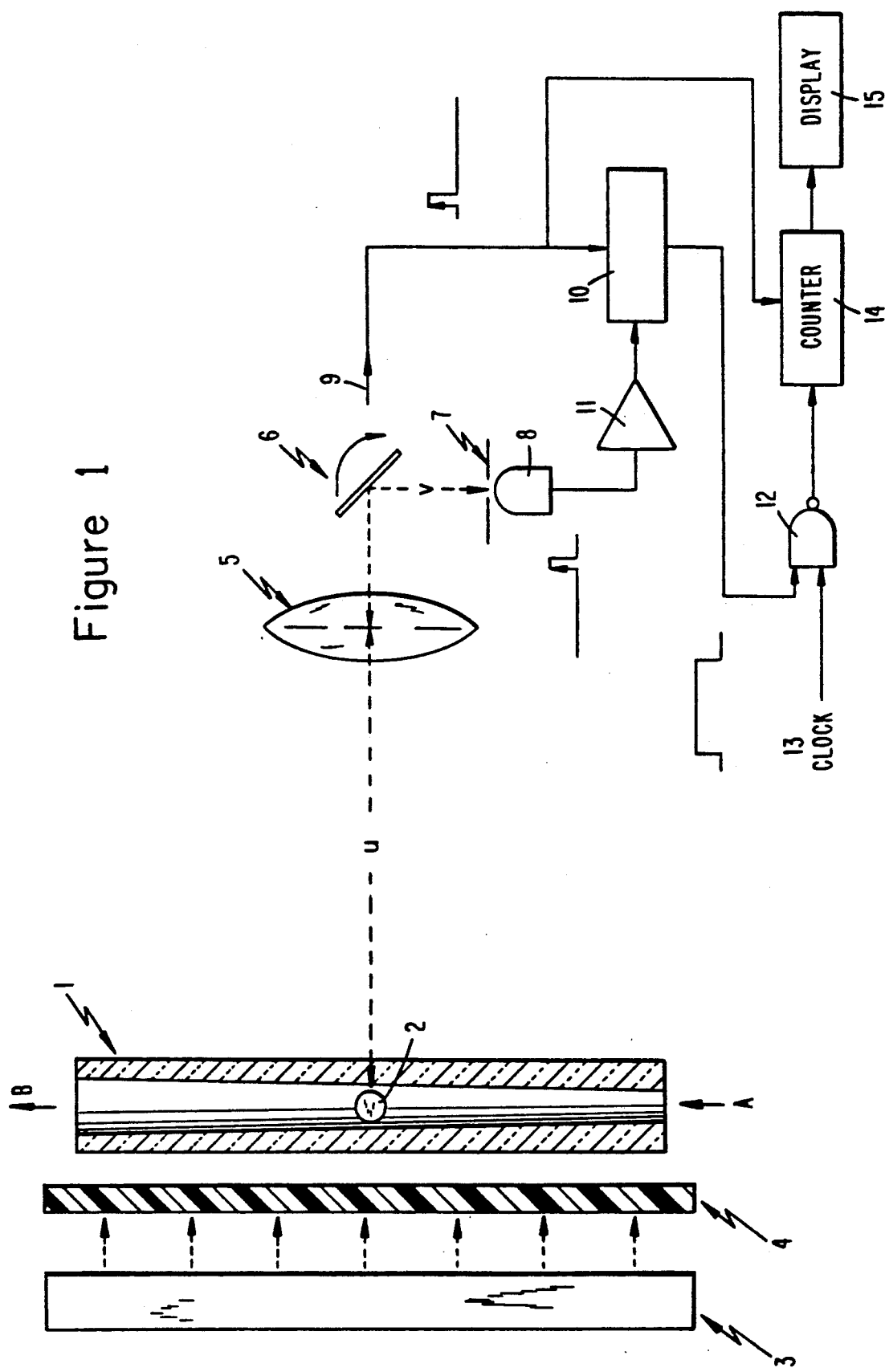
FIG. 1 is a schematic diagram illustrating the scanning system associated with the flow meter according to an embodiment of the present invention.

Referring now to the FIG. 1, there is shown a flow meter 1 which, as illustrated in the drawing includes float or meter tube and a float positioned within the float or meter tube. The float, which may have the shape of a ball or other conventional plummot design, is vertically disposable within the float or meter tube under the influence of a fluid such as a liquid or gas which enters the tube from inlet A and travels upwardly through the tube to exit at outlet B. The float or meter tube, according to the present invention, is made of a transparent material such as plastic or glass, with glass being the more preferred material of construction since glass is more likely to hold dimensional tolerances with extended use. The float itself can be made of any inert material such as a metal, e.g., stainless steel, or a plastic or resinous material, such as Teflon having a sufficient density so as to be sufficiently non buoyant in the particular fluid whose flow is to be measured. If used in environments of high magnet fields, such as NMR, non-magnetic materials should be provided.

In order to properly image the flow meter in accordance with the present invention light source 3 and light diffuser/aperture 4 are positioned on one side of the flow meter. In operation light from light source 3 passes through the diffusor/aperture 4 and illuminates the flow meter 1. Although illuminating the flow meter is generally required, if sufficient lighting conditions exist in the ambient environment it may not be necessary to illuminate the flow meter A converging lens 5, positioned on an opposite side of the flow meter focuses the image of the flow meter onto mirror 6 which is attached to a rotating shaft. A synchronous motor attached to mirror 6 by means of the shaft causes the mirror to rotate at a known RPM. The rotation of mirror 6 causes the image of the rotameter to reflect off the mirror and traverse across an aperture plate 7 in a scanning fashion. A photodetector 8 mounted behind aperture 7 detects the image as it traverses across aperture 7. The positioning of the converging lens 5, rotating mirror 6 and photodetector 8 is such that the focal length of the lens (f), the object or flow meter distance (u) and the image distance (v) are related by the equation:

$$\frac{1}{f} = \frac{1}{v} - \frac{1}{u}$$

An electronic switch attached to the motor shaft which rotates mirror 6 signals the start of a scan and produces a start scan trigger signal. This start scan trigger is applied to the "set" input of flip-flop 10 which can be, for example, an SR type flip-flop. The output of photodetector 8 is applied to the input of amplifier/comparator 11. The output of amplifier/comparator 11 is applied to the "reset" input of flip-flop 10. Thus, the output from flip-flop 10 which is applied to gate 12 is responsive to the scan period. Of course, other types of flip-flops may be used such as toggle or "T" type flip flops. The required circuitry necessary in utilizing other flip-flops is a matter within the skill of the ordinary practitioner.

Clock 13 is utilized to time the scan period for determining the location or position of the float. The output from clock 13 is fed into gate 12 the output of which is applied to counter 14. The output of counter 14 is applied to a suitable display means 15 or other data collection and/or storage means (not illustrated).

In addition to receiving an input from gate 12, circuitry is provided so that counter 14 may receive a reset signal directly from start scan trigger signal. In operation, the electronic circuitry times the period from the scan start to when the shadow of that flow meter float image traverses the aperture. Knowing the rotational speed of mirror 6 and the measured time from the start of the scan to the float image allows the electronic circuitry to determine the float position. A digital output from the electronic circuit is directed to a suitable display means 15, which may include as a digital panel meter readout and/or a computer interface for automatic data collection and flow monitoring and/or control.

Figure 2:
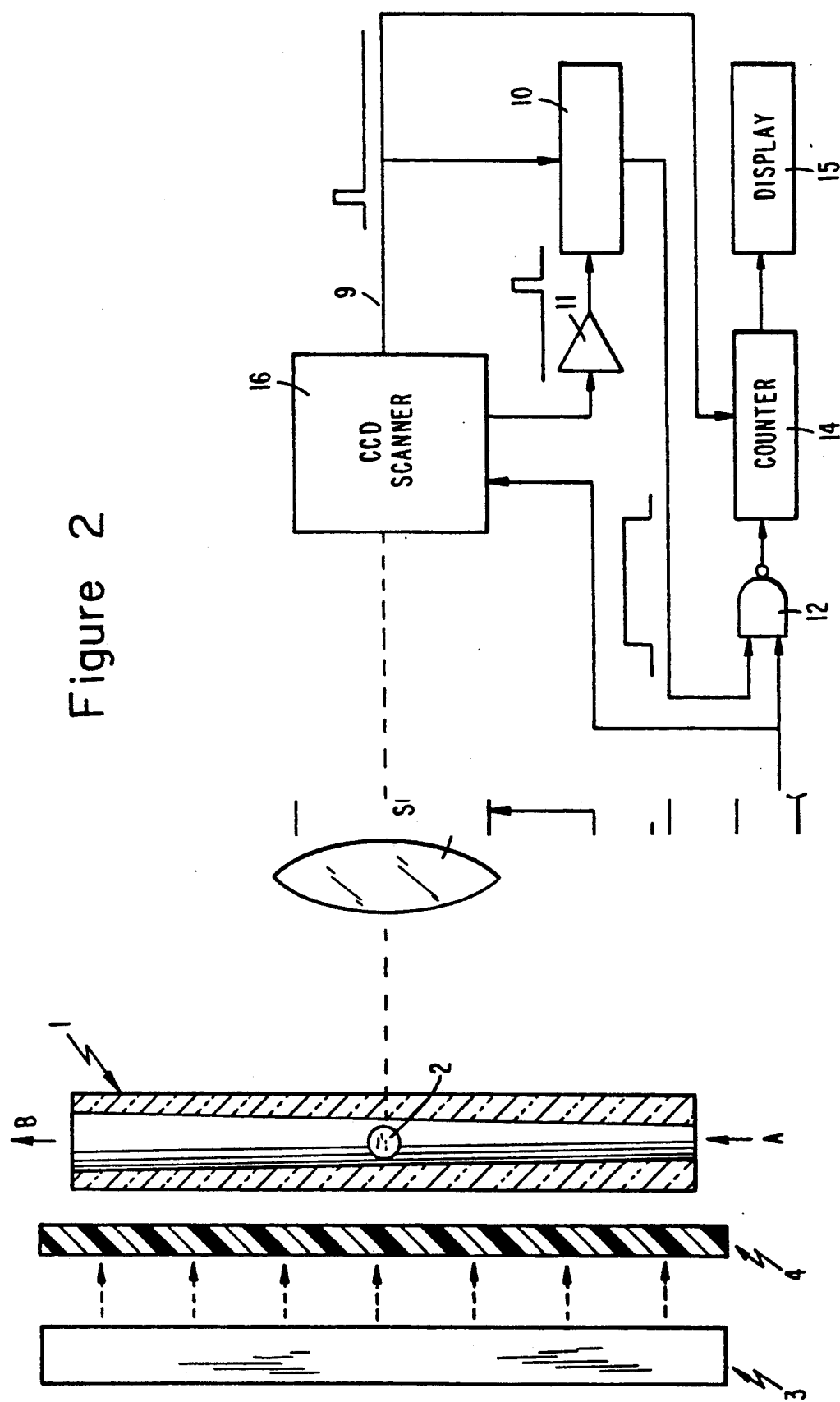
FIG. 2 is a schematic diagram illustrating an embodiment of the present invention which utilizes a scanning charge coupled device.

While the above discussed circuitry provides for optical scanning in one preferred embodiment which is illustrated in FIG. 1, in another embodiment illustrated in FIG. 2 the circuitry utilized to scan the flow meter may be replaced by a scanning charge coupled device (CCD) 16. With reference to FIG. 2, it is noted that in FIGS. 1 and 2 similar or corresponding elements are identified by common reference numbers in each of the figures. Accordingly, other than the scanning charge coupled device 16, the description of the other elements which are illustrated in FIG. 2 is given above with reference to FIG. 1.

The optical scanner of the present invention is particularly advantageous in that very low flow rates of liquids and gases may be measured without contacting the measured fluid with metal parts. In this regard the apparatus of the present invention may be used in environments associated with large magnetic fields such as NMR. The optical scanner for the present invention is found to be particularly useful for automatic data collection of flow rates during NMR studies of profused working hearts. The use of the optical scanner, with a standard rotameter flow, permits electronic flow measurement in which the measured liquid only contacts glass and other non metals such as Teflon. In this regard the system is immune to the strong magnetic fields which exist next to an NMR magnet.

The scanning apparatus may be attached to a standard glass rotameter flow gauge to optically scan the flow gage and determine the rotameters float location.

The optical scan is converted to an electric signal proportional to the flow rate and is displayed on a suitable display such as a digital meter. The electronic signal may also be directed to a personal computer for automatic data collection.

As discussed in detail above, the electronic readout device of the present invention includes means for optically scanning a rotameter flow gage and for determining the position of a float within the rotameter. In particular, the optically scanning means includes means for imaging the rotameter.

In one embodiment the means for imaging the rotameter comprises a lens for focusing the image of the rotameter onto a rotating mirror. The rotating mirror in turn causes the focused image of the rotameter to traverse across an aperture behind which a photodetector is positioned for receiving and detecting the focused image of the rotameter. Necessary electronic circuitry means are provided for timing the scanning of the rotameter and for determining the float position from the scanning period and the rotational speed of the rotating mirror.

Although it may be possible to image the rotameter under ambient lighting conditions, the present invention provides for means for illuminating the rotameter to insure proper imaging.

While the above embodiment includes numerous interacting elements to optically scan the rotameter, in another embodiment the described scanning system is replaced with a scanning charge coupled device detector.

As discussed above, the electronic readout device of the present invention is designed to be utilized in conjunction with conventional rotameters. In this regard, the present invention is particularly suitable for use in existing flow systems. Additionally, the present invention is further directed to a fluid flow measuring system that includes a rotameter having a float therein and means for optically scanning said rotameter for determining the position of said float as discussed above. Such a system involves the combination of the rotameter and the optical scanning system as individual elements or as a single unitary device.

In use, the fluid flow measuring system can be combined with a suitable display means or data collecting or storage means. Additionally, the fluid flow measuring system can be utilized in a fluid flow monitoring and control system.

In addition to the electronic readout and the fluid flow measuring system, the present invention includes a particular method for measuring fluid flow which involves optically scanning a rotameter and determining the position of a float within the rotameter. This optical scanning involves an imaging device that periodically scans and detects the position of the float.

In one embodiment the imaging device utilizes a rotating mirror to optically scan said rotameter. In another embodiment the optical scanning is performed by means of a scanning charge coupled device detector.

The invention has been described herein with reference to certain preferred embodiments. However, as obvious variations thereof will become apparent to those skilled in the art, the invention is not to be considered limited thereto.

We claim:

1. An electronic readout for a rotameter flow gage which comprises means for optically scanning a rotameter flow gage and determining the position of a float within the rotameter, wherein said means for optically scanning comprises means for imaging the rotameter which includes a lens for focusing the image of the rotameter onto a rotating mirror, an aperture across which the focused image of the rotameter traverses in response to the rotation of said mirror and a photodetector positioned behind the aperture to receive and detect the focused image of the rotameter, said lens and photodetector each being located in fixed positions relative to said rotameter flow gage.

2. An electronic readout for a rotameter flow gage according to claim 1 wherein said means for imaging further comprises electronic circuitry means for timing the scanning of the rotameter and for determining the float position from the scanning period and the rotational speed of the rotating mirror.

3. An electronic readout for a rotameter flow gage according to claim 1 wherein said means for imaging further comprises means for illuminating the rotameter, said illuminating means being located in a fixed position relative to said rotameter flow gage.

4. A fluid flow measuring system which comprises a rotameter having a float therein and means for optically scanning said rotameter for determining the position of said float, wherein said means for optically scanning comprises means for imaging said rotameter which includes a lens for focusing the image of said rotameter onto a rotating mirror, an aperture across which the focused image of the rotameter traverses in response to the rotation of said mirror and a photodetector positioned behind the aperture to receive and detect the focused image of said rotameter, said lens and photodetector each being located in fixed positions relative to said rotameter.

5. A fluid flow measuring system according to claim 4 wherein said means for imaging further comprises electronic circuitry means for timing the scanning of said rotameter and for determining the float position from the scanning period and the rotational speed of said rotating mirror.

6. A fluid flow measuring system according to claim 4 wherein said means for imaging further comprises means for illuminating the rotameter.

7. A fluid flow measuring system according to claim 4 further comprising means to display or store measured fluid flow values.

8. A method for measuring fluid flow which comprises optically scanning a rotameter and determining the position of a float within said rotameter, wherein said optical scanning is performed by forming an image of said float onto a rotating mirror, illuminating the float by means of a stationary illumination means and rotating said mirror to periodically scan and detect the position of said float by means of a stationary detector.

9. A method for measuring fluid flow according to claim 8 wherein measured fluid flow is displayed or automatically collected.

10. A method for measuring fluid flow according to claim 9 wherein measured fluid flow is further utilized to monitor and control fluid flow.

11. An electronic readout for a rotameter flow gage which comprises means to form an image of said rotameter flow gage, including a float within said rotameter, means for projecting said formed image in a scanning manner across a detector which is located in a fixed position relative to said rotameter flow gage, and means for determining the position said float in said rotameter flow gage.

12. A method for determining the position of a float in a rotameter flow gage which comprises forming an image of said rotameter flow gage and said float therein, projecting said formed image in a scanning manner across a detector which in located in a fixed position relative to said rotameter and determining from said scanning frequency, the location of said float within said rotameter.

13. An apparatus for measuring fluid flow in which the relative position of a movable object supported in a housing means is indicative of a fluid flow rate comprising means for forming an image of said movable object and said housing means, means for projecting said formed image in a scanning manner across a detector which is located in a fixed position relative to said housing means, means for determining the position of said movable object relative to said housing means, and means for determining fluid flow rate from the relative position of said movable object.

14. A method for measuring fluid flow by determining the relative position of an object movably supported in a housing means through which at least a portion of said fluid flows which method comprises forming an image of said movable object and said housing means, projecting said formed image in a scanning manner across a detector which is located in a fixed position relative to said housing means, determining from said scanning frequency, the position of said movable object relative to said housing means, and determining fluid flow rate from the relative position of said movable object.

15. A method for measuring fluid flow which comprises optically scanning a rotameter and determining the position of a float within said rotameter, wherein said optical scanning is performed by forming an image of said float, illuminating said float by means of a stationary illumination means, projecting said image of said float onto a scanning charge coupled device to generate a signal which is proportional to the position of said float and determining the position of said float from said generated signal.

* * * * *